(No Model.)
J. SALICK.
WATCH MAKER'S TOOL.
No. 433,218. Patented July 29, 1890.
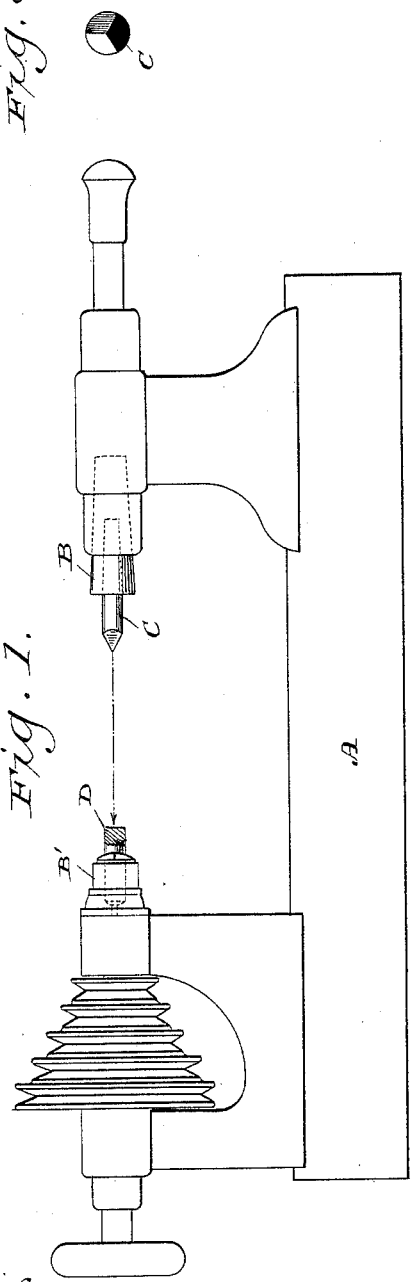
Inventor
Joseph Salick,
By Stout & Underwood
Attorneys
Witnesses
Geo. W. Young.
Wm Klug

UNITED STATES PATENT OFFICE.

JOSEPH SALICK, OF WATERTOWN, WISCONSIN.

WATCH-MAKER'S TOOL.

SPECIFICATION forming part of Letters Patent No. 433,218, dated July 29, 1890.

Application filed May 17, 1890. Serial No. 352,234. (No model.)

*To all whom it may concern:*

Be it known that I, JOSEPH SALICK, of Watertown, in the county of Jefferson, and in the State of Wisconsin, have invented certain new and useful Improvements in Watch-Makers' Tools; and I do hereby declare that the following is a full, clear, and exact description thereof.

My invention relates to watch and clock makers' tools, and will be fully described hereinafter.

In the drawings, Figure 1 is a side elevation of a lathe, showing a portion of my invention. Fig. 2 is a broken section of a hub or staff for a balance-wheel or pinion with one pivot removed. Fig. 3 is a like view with one pivot unfinished. Fig. 4 is a view with both pivots finished. Fig. 5 is a section of a chuck with a drill in place. Fig. 6 is an elevation of the staff or hub and cutting-tool. Fig. 7 is a front end view of the cutting-tool, and Fig. 8 is a front end view of a marker forming part of my invention.

A is an ordinary lathe, and B B' are its chucks.

C is a marker that in the first stage of making a hub or staff is placed in chuck B, and D is the blank which is placed in chuck B'. The chuck B is now advanced until the marker strikes the end of the blank D, and as the lathe is in motion the marker makes a dent or recess in the center of the blank. The chuck B is then drawn back, and a chuck E, Fig. 5, which contains a drill E', is substituted for it and the chuck B again advanced, and the drill E' makes a bore in blank D, such as is shown in Fig. 2, after which chuck B is again drawn back, a pivot-point $b$ inserted in the bore, and a chuck F, from which projects a bevel-ended knife F', is substituted for chuck B, and by means of this knife the pivot-point $c$ and its conical shoulder are made on the end of the hub or staff blank D, and then when both pivots have been made in this way they are ready for polishing and are exactly centered. In replacing the pivot that has been broken from a wheel or pinion the same process is carried out.

Having thus described my invention, what I claim as new, and desire to secure by Letters Patent, is—

In a watch-maker's tool, the combination, with a lathe-chuck for containing a blank, of a marker also chucked in the lathe, and a series of tools adapted for successive adjustments in one of the chucks of said lathe for finishing the said blank on the center established by said marker, substantially as set forth.

In testimony that I claim the foregoing I have hereunto set my hand, at Milwaukee, in the county of Milwaukee and State of Wisconsin, in the presence of two witnesses.

JOSEPH SALICK.

Witnesses:
  S. S. STOUT,
  WM. KLUG.